US012789193B2

(12) United States Patent
Tu et al.

(10) Patent No.: US 12,789,193 B2
(45) Date of Patent: Nov. 10, 2026

(54) GLASS PANEL RECYCLING MECHANISM

(71) Applicant: Reverse Energy Solutions Corp., Chicago, IL (US)

(72) Inventors: Hsiao-Feng Tu, New Taipei (TW); Wen-Chieh Liao, Taipei (TW)

(73) Assignee: REVERSE ENERGY SOLUTIONS CORP., Chicago, IL (US)

( * ) Notice: Subject to any disclaimer, the term of this patent is extended or adjusted under 35 U.S.C. 154(b) by 202 days.

(21) Appl. No.: 18/911,446

(22) Filed: Oct. 10, 2024

(65) Prior Publication Data

US 2026/0027566 A1 Jan. 29, 2026

(30) Foreign Application Priority Data

Jul. 29, 2024 (TW) ................................ 113128108

(51) Int. Cl.
*B02C 4/08* (2006.01)
*B02C 4/42* (2006.01)

(52) U.S. Cl.
CPC .................. *B02C 4/08* (2013.01); *B02C 4/42* (2013.01); *B02C 2201/06* (2013.01)

(58) Field of Classification Search
CPC .......... B02C 4/02; B02C 4/08; B02C 18/2283
See application file for complete search history.

(56) References Cited

U.S. PATENT DOCUMENTS

| | | | | |
|---|---|---|---|---|
| 3,998,396 A * | 12/1976 | Umphrey | B02C 23/08 209/261 |
| 4,294,414 A * | 10/1981 | Gerstenberg | B02C 18/2283 241/222 |
| 6,565,022 B1 * | 5/2003 | Clements | B02C 4/286 241/185.5 |
| 8,162,243 B2 * | 4/2012 | Wenthe | B02C 4/286 241/60 |
| 2014/0209723 A1 * | 7/2014 | Ebadian | B02C 18/24 241/49 |
| 2021/0114038 A1 * | 4/2021 | Sandnes | B02C 21/02 |
| 2024/0100538 A1 * | 3/2024 | Conrad | B02C 4/08 |

* cited by examiner

*Primary Examiner* — Matthew Katcoff
(74) *Attorney, Agent, or Firm* — Muncy, Geissler, Olds & Lowe, P.C.

(57) ABSTRACT

The present invention relates to a glass panel recycling mechanism, which includes a material inlet provided on one side of a working space of a base for preset waste materials to enter, a transfer unit provided on the base to transport the preset waste materials by driving a plurality of transfer wheel sets through a driving device, a processing unit installed on the base below the transfer unit, a power unit for driving multiple crushing wheel cutter sets to press and break the glass panels on the surfaces of the preset waste materials, a collection device installed at the bottom of the base below the processing unit for collecting the waste of the preset waste materials to sent the waste to the outside by a conveyor belt so that the glass panels on the surfaces of the preset waste materials can be processed.

7 Claims, 7 Drawing Sheets

GLASS PANEL RECYCLING MECHANISM

This application claims the priority benefit of Taiwan patent application number 113128108, filed on Jul. 29, 2024.

BACKGROUND OF THE INVENTION

1. Field of the Invention

The present invention provides a glass panel recycling mechanism, in particular a recycling mechanism that can process a glass panel on the surface of a preset waste material. By arranging a transfer unit, a processing unit and a recycling area on a base, the glass panel on the surface of the preset waste material can be pressed and broken into glass waste, thereby achieving the purpose of recycling waste materials and waste to reuse.

2. Description of the Related Art

As domestic electricity consumption continues to increase and power supply becomes very tight, many companies, factories, or homes will install solar panels to store electricity to provide part of the required electricity. The solar power generation collects heat energy from sunlight through solar panels and converts it into electrical energy to meet various power needs. The solar panels generally used are composed mainly of a solar cell module sandwiched between two layers of ethylene vinyl acetate (EVA), and then encapsulated with a glass panel and an insulating backplane to form a layered composite structure. However, the solar panels are usually installed on a certain scale and the number of solar panels used is also considerable. However, the solar panels have a certain lifespan. When they can no longer be used, they must be discarded and new solar panels must be installed to generate electricity. As for discarded solar panels, they need to be recycled and processed to avoid pollution or damage to the environment.

Currently, the recycling of discarded solar panels mostly adopts methods such as thermal cracking, hot knife, chemical treatment, laser or incineration, etc. Usually, the frame of the solar panel is dismantled first, the glass on the solar panel is crushed, and the electronic products are recycled. Then, different waste materials such as glass, metal or plastic are broken into small pieces by mechanical crushing before further processing. However, the solar panels are large in size and heavy in weight, and both assembly and disassembly are time-consuming and labor-intensive. After they are discarded, the processing of various types of discarded solar panels must be carried out separately and in batches. The handling, transfer, stacking or storage of waste materials during the process also causes considerable trouble and is likely to cause harm to the safety of workers. Not only does it require a large amount of manpower to carry out the processing operations, but it also requires larger and more space for various processing operations to be implemented and executed. The waste materials treatment process is extremely time-consuming and labor-intensive, and is not economical. There are many deficiencies that need to be improved.

SUMMARY OF THE INVENTION

Therefore, in view of the above problems and deficiencies, the inventor collected relevant information, evaluated and considered various aspects, and used his many years of experience in this industry to continuously create, research and improve, and finally designed the invention patent of this glass panel recycling mechanism.

The main object of the present invention is that the glass panel recycling mechanism comprises a material inlet on one side of the base for preset waste materials to enter, a transfer unit provided on the base on one side of the material inlet to drive a plurality of transfer wheel sets through a driving device to transport the preset waste materials, a processing unit installed on the base below the transfer unit, a power unit used to drive a plurality of crushing wheel cutter sets to press and destroy the glass panels of the preset waste materials, a collection device in a recycling area installed at the bottom of the base below the processing unit for collecting the waste from the preset waste materials and a conveyor belt for sending the waste to the outside, so as to achieve the purpose of processing the glass panels on the surface of the preset waste materials.

Another object of the present invention is that a feed area may be further provided on the outside of the material inlet on one side of the working space of the base, and the feed area comprises a feed conveyor belt set opposite to the material inlet and a driving unit for driving the feed conveyor belt, and a plurality of abutting roller sets are provided on the feed conveyor belt, and a plurality of abutting rollers respectively assembled on each abutting roller set can be soft plastic wheels, silicone wheels or rubber wheels, etc., which can abut the preset waste materials on the feed conveyor belt and then send them toward the material inlet of the base.

Still another object of the present invention is that the base is provided with a working space inside, which can be used to assemble the transfer unit and the processing unit, etc., the material inlet is provided on one side of the working space, and a material inlet roller set driven by a power device is provided at the material inlet, the power device can be a motor, etc.

Still another object of the present invention is that the driving device of the transfer unit may be a motor, etc., and a chain and sprocket set, a belt and belt pulley set, or a gear and rack set is provided between the driving device and the plurality of transfer wheel sets for transmitting power.

Still another object of the present invention is that the power unit of the processing unit may be a motor; each of the plurality of crushing wheel cutter sets comprise a wheel axle and a wheel cutter assembled on the wheel axle in a sheet form or is integrally formed on the wheel axle, and the wheel cutters of the crushing wheel cutter sets are of the same or different outer diameters, and each wheel cutter comprises a wheel portion and a plurality of cutting teeth in the form of saw teeth, trapezoidal teeth, conical teeth or bevel teeth, etc. formed on the periphery of the wheel portion, and a transmission device, which can be a chain and sprocket set, a belt and belt pulley set, or a gear and rack set, is provided between the power unit and the plurality of crushing wheel cutter sets for transmitting power.

DETAILED DESCRIPTION OF THE INVENTION

In order to achieve the above-mentioned objects and effect, the technical means and structure, implementation method, etc. adopted by the present invention are described in detail with reference to the preferred embodiment of the present invention, and its features and functions are as follows, so as to facilitate a complete understanding.

Figure 1:
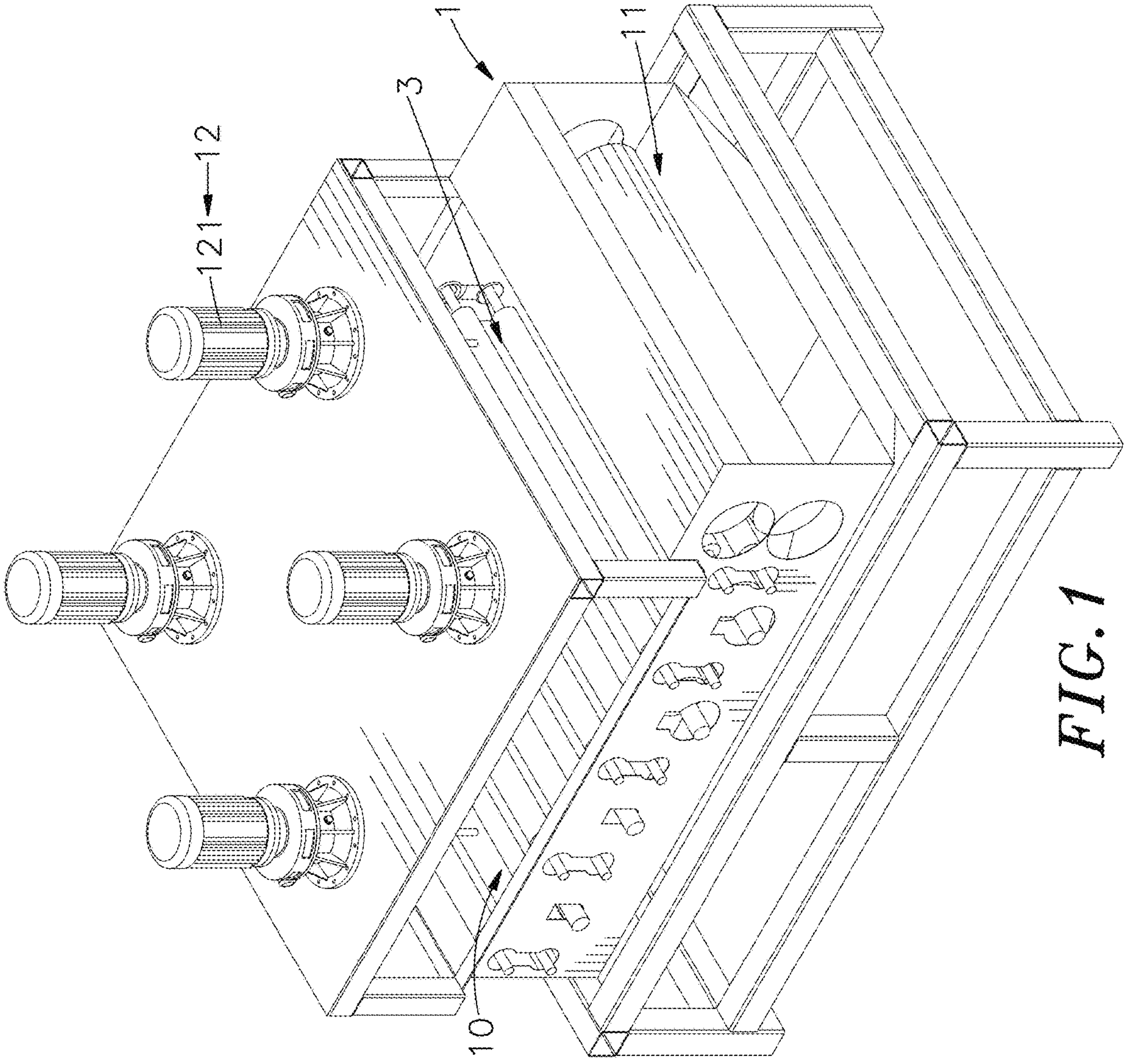
FIG. 1 is a three-dimensional external view of the present invention.
Figure 2:
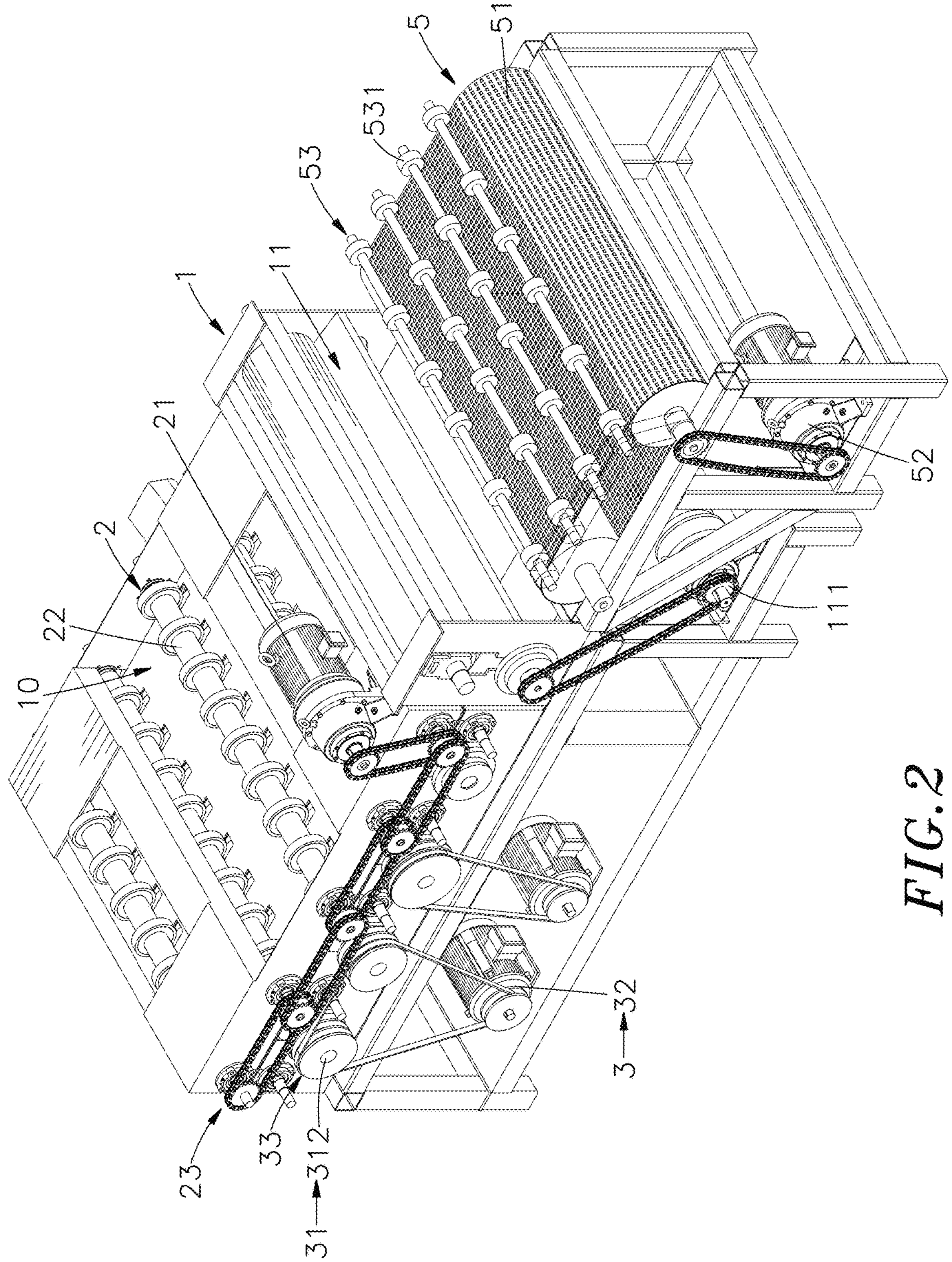
FIG. 2 is a three-dimensional external view of a preferred embodiment of the present invention.
Figure 3:
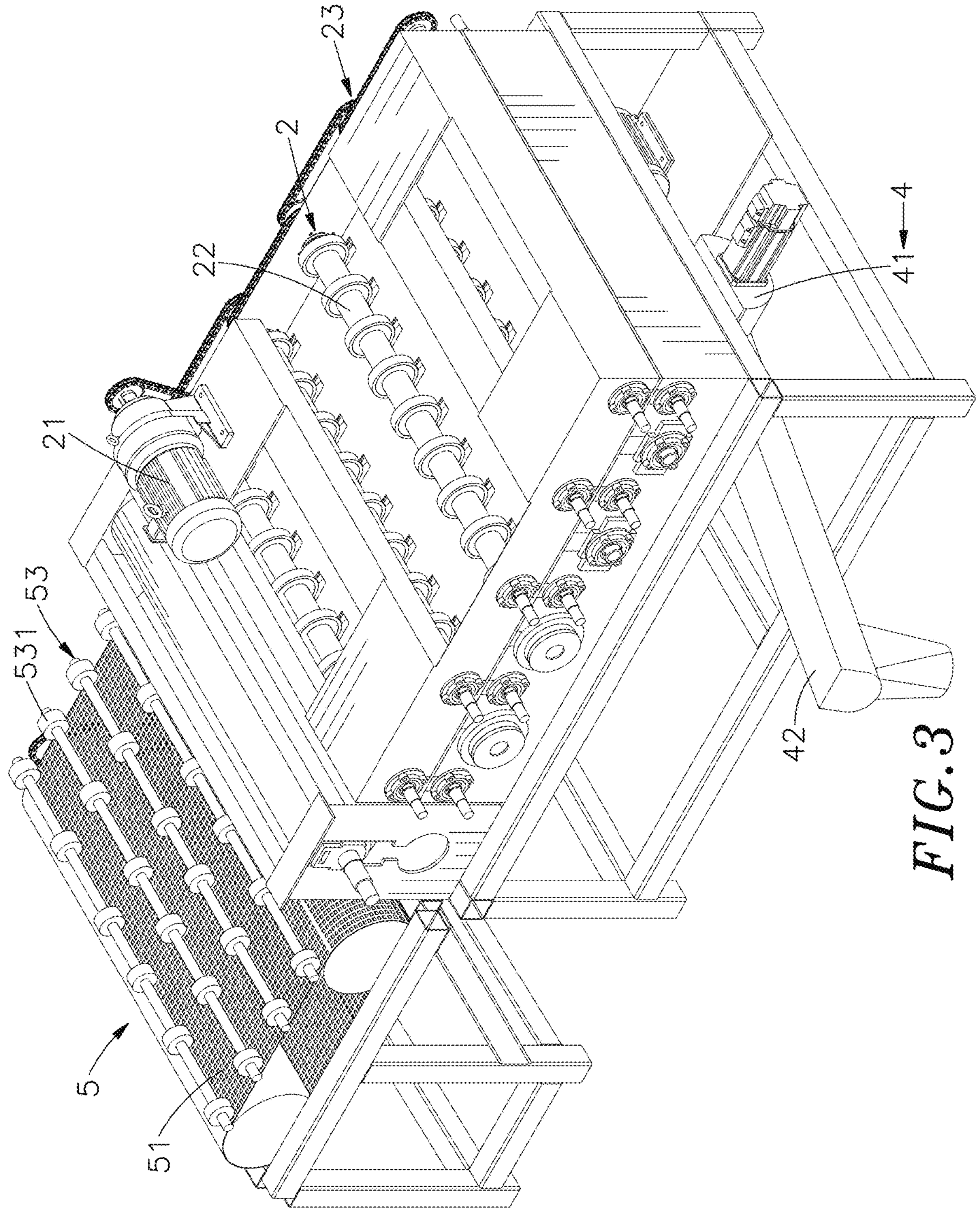
FIG. 3 is a three-dimensional external view of the preferred embodiment of the present invention from another viewing angle.
Figure 4:
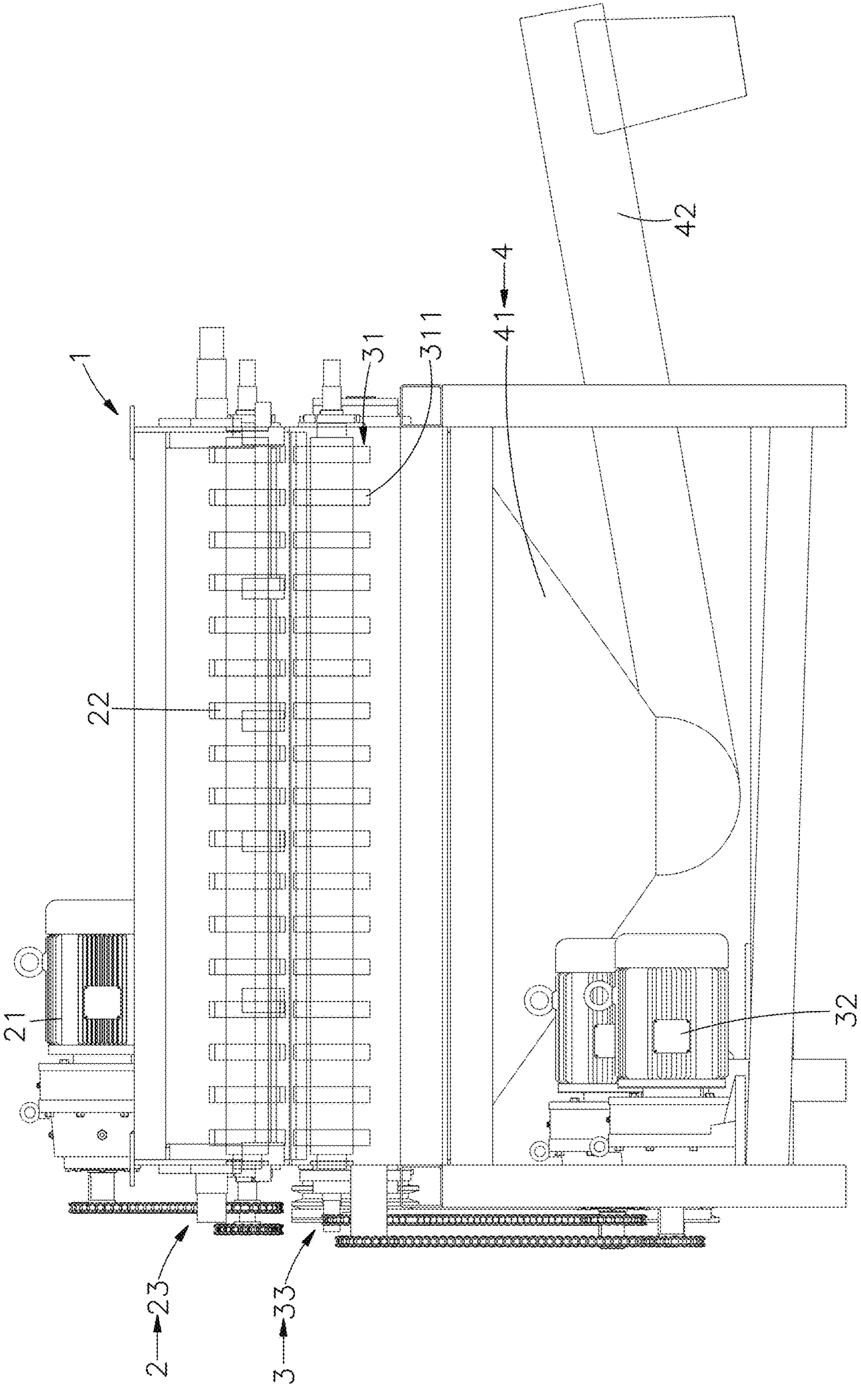
FIG. 4 is a side view (I) of the preferred embodiment of the present invention.
Figure 5:
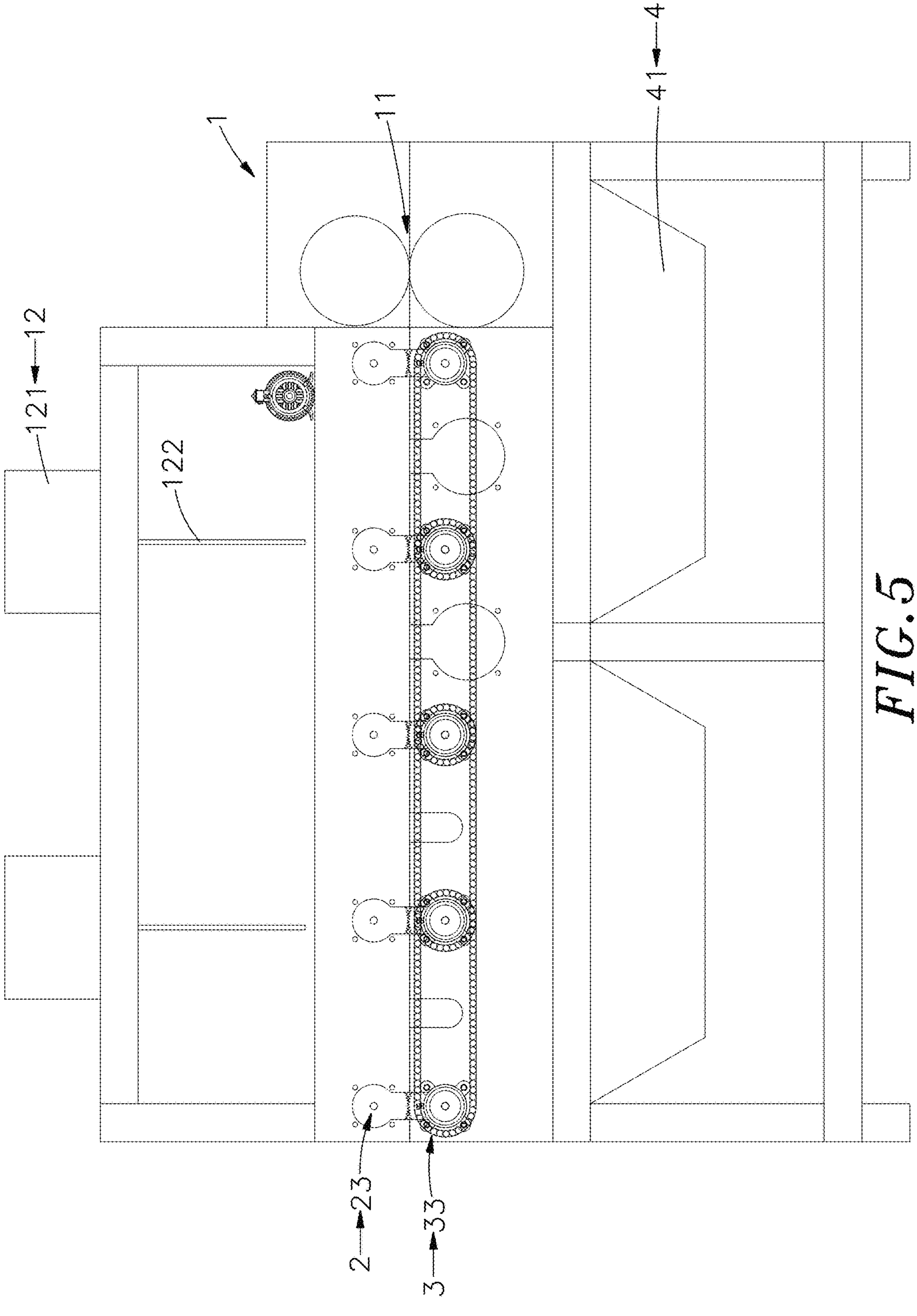
FIG. 5 is a side view (II) of the preferred embodiment of the present invention.
Figure 6:
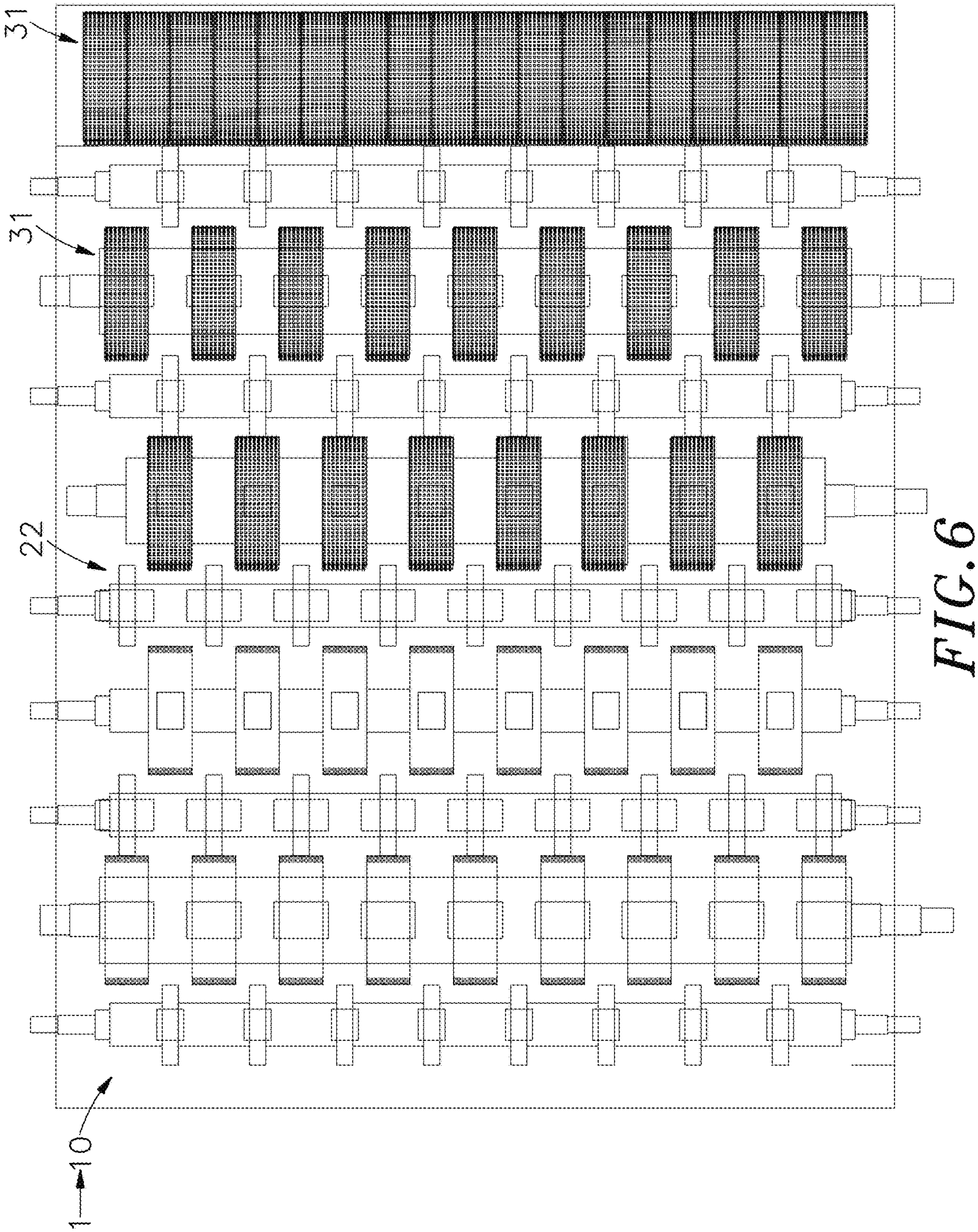
FIG. 6 is a top view of the processing unit of the preferred embodiment of the present invention.
Figure 7:
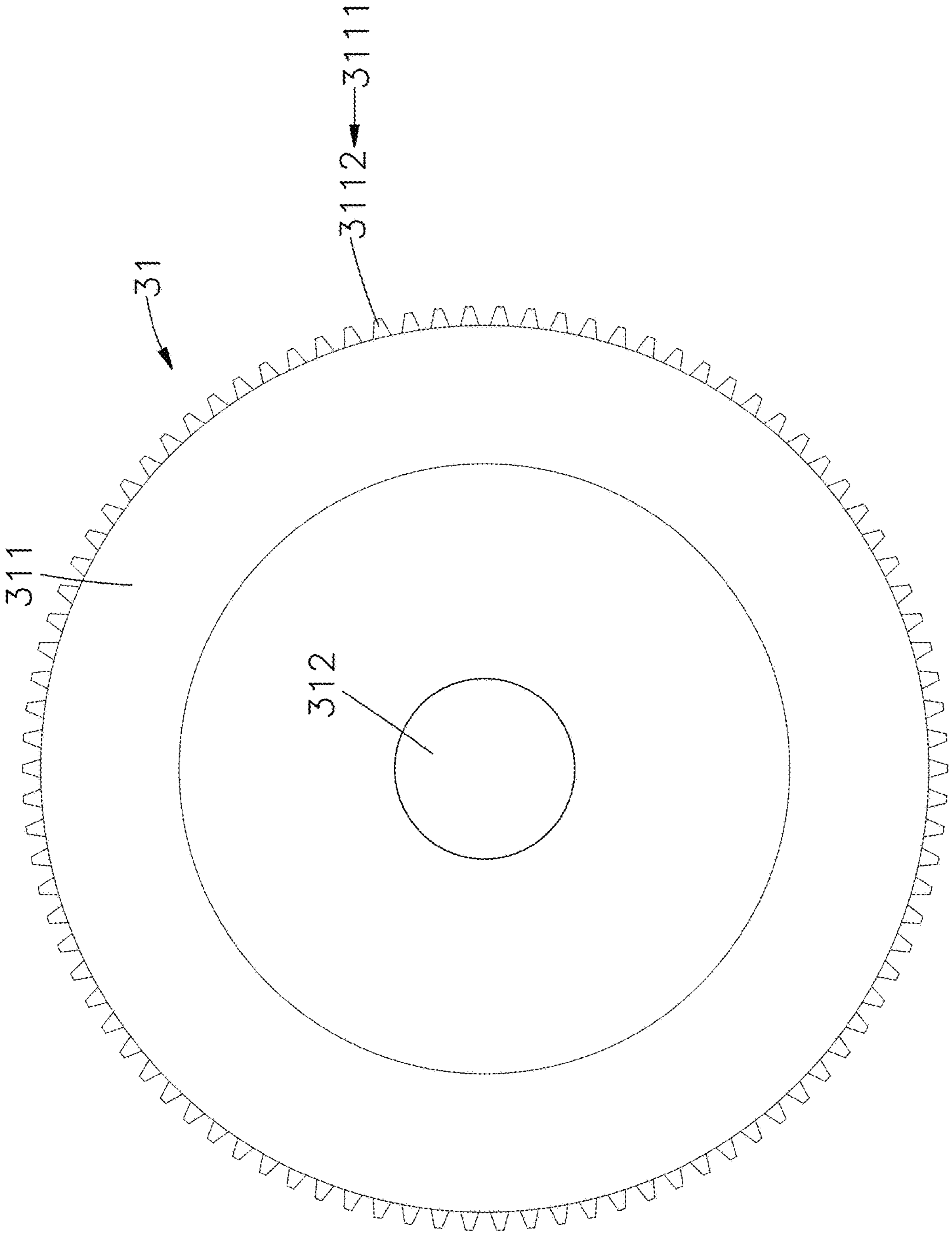
FIG. 7 is a side view of the crushing wheel cutter set of the present invention.

Please refer to FIGS. 1 to 7. The glass panel recycling mechanism of the present invention comprises a base 1, a transfer unit 2, a processing unit 3 and a recycling area 4.

The base 1 has a working space 10 inside and a material inlet 11 on one side of the working space 10 for the input of preset waste materials.

The transfer unit 2 is disposed on the base 1 on one side of the material inlet 11 and located at the working space 10, and comprises a driving device 21 and a plurality of transfer wheel sets 22 driven by the driving device 21.

The processing unit 3 is disposed on the base 1 below the transfer unit 2 and is also located at the working space 10, and comprises a plurality of crushing wheel cutter sets 31 and a power unit 32 for driving the plurality of crushing wheel cutter sets 31.

The recycling area 4 is located at the bottom of the base 1 below the processing unit 3 and comprises a collection device 41 and a conveyor belt 42. The collection device 41 is located below the plurality of crushing wheel cutter sets 31 and can collect waste of the preset waste materials, and the conveyor belt 42 located below the collection device 41 can send the waste to the outside.

The above-mentioned preset waste materials may be discarded or faulty solar panels that are to be recycled and are waiting to be processed.

The above-mentioned base 1 of the present invention has the hollow working space 10 inside, and the working space 10 is used to assemble the transfer unit 2 and the processing unit 3. The material inlet 11 is provided at one side of the working space 10, and a material inlet roller set 112 driven by a power device 111 is provided at the material inlet 11. The power device 111 may be a motor, etc. Furthermore, the base 1 may further provide with a feed area 5 on the outer side of the material inlet 11 on one side of the working space 10. The feed area 5 comprises a feed conveyor belt 51 and a driving unit 52 for driving the feed conveyor belt 51 to operate. The feed conveyor belt 51 is positioned opposite to the material inlet 11, and a plurality of abutting roller sets 53 are disposed on the feed conveyor belt 51. A plurality of abutting rollers 531 respectively assembled on each abutting roller set 53 may be soft plastic wheels, silicone wheels or rubber wheels, etc., and may abut the preset waste materials on the feed conveyor belt 51 and then send them toward the material inlet 11 of the base 1.

The driving device 21 of the above-mentioned transfer unit 2 of the present invention may be a motor, etc., and a transmission device 23 for transmitting power is provided between the driving device 21 and the plurality of transfer wheel sets 22. The transmission device 23 may be a chain and sprocket set, a belt and belt pulley set, or a gear and rack set. A limit unit 12 is provided above the working space 10 of the base 1 relative to the transfer unit 2. A plurality of driving motors 121 of the limit unit 12 respectively drive the limit shafts 122 located above the transfer wheel sets 22 to perform longitudinal lifting and axial rotation.

Furthermore, the power unit 32 of the above-mentioned processing unit 3 of the present invention can be a motor, etc., and each of the crushing wheel cutter sets 31 comprise a wheel axle 312 and a wheel cutter 311 assembled on the wheel axle 312 in a sheet form or is integrally formed on the wheel axle 312. The wheel cutters 311 of the crushing wheel cutter sets 31 are of the same or different outer diameters. Each wheel cutter 311 comprises a wheel portion 3111 and a plurality of cutting teeth 3112 formed on the periphery of the wheel portion 3111. The cutting teeth 3112 can be in various shapes such as saw teeth, trapezoidal teeth, conical teeth or bevel teeth, etc. A transmission device 33 for transmitting power is provided between the power unit 32 and the plurality of crushing wheel cutter sets 31. The transmission device 33 may be a chain and sprocket set, a belt and belt pulley set, or a gear and rack set.

When the glass panel recycling mechanism of the present invention is implemented, the feed conveyor belt 51 of the feed area 5 outside the material inlet 11 of the base 1 can be driven by the driving unit 52 to transport the preset waste materials (which can be the discarded or faulty solar panels that are to be recycled and waiting to be processed). The plurality of abutting rollers 531 on the plurality of abutting roller sets 53 are used to press the preset waste materials to be stably positioned on the feed conveyor belt 51 for transportation, so as to prevent vibration, deviation, displacement or falling. The feed conveyor belt 51 transfers the preset waste materials to the material inlet 11 of the base 1. The preset waste materials enter the working space 10 of the base 1 through the material inlet 11. The transfer wheel sets 22 are driven by the driving device 21 of the transfer unit 2 in the working space 10 through the transmission device 23. The driving motors 121 of the limit unit 12 are used to drive the limit shafts 122 to move longitudinally and rotate axially to support the preset waste materials, so that the preset waste materials can be smoothly transferred without jumping, shaking or deflection. At the same time, the power unit 32 of the processing unit 3 drives the transmission device 33 to link the wheel axles 312 of the plurality of crushing wheel cutter sets 31 to rotate, and each wheel axle 312 of each crushing wheel cutter set 31 can respectively drive the wheel cutter 311 to rotate at a predetermined speed (The speed of each wheel cutter 311 needs to be adjusted to be faster or slower depending on the application conditions, but this is not the focus of the present invention, so the method of speed adjustment will not be described in detail.). The preset waste materials can be pressed by the plurality of cutting teeth 3112 at the outer edge of the wheel portion 3111 of each wheel cutter 311, so that the glass panels covering the surfaces of the preset waste materials are rolled, pushed and broken into glass fragments. The glass fragments fall down to the collection device 41 of the recycling area 4 along the gaps between the crushing wheel cutter sets 31, and are then sent out through the conveyor belt 42 for subsequent processing.

The above is merely a preferred embodiment of the present invention and is not intended to limit the patent scope of the present invention. Therefore, all simple modifications and equivalent structural changes made by using the contents of the description and drawings of the present invention should be included in the patent scope of the present invention and should be declared.

In summary, the glass panel recycling mechanism of the present invention can truly achieve its effect and purpose when it is actually applied. Therefore, this invention is truly a research and development creation with excellent practicality. In order to meet the application requirements for invention patents, an application is filed in accordance with the law. I hope that the review committee will approve this case as soon as possible to protect the inventor's hard work in research and development. If the review committee has any questions, please feel free to write to us for instructions. The inventor will do his best to cooperate and will be very grateful.

What is claimed is:

1. A glass panel recycling mechanism, comprising:

a base comprising a material inlet on one side thereof for the entry of the preset waste materials;

a transfer unit disposed on said base on one side of said material inlet, said transfer unit comprising a driving device and a plurality of transfer wheel sets driven by said driving device;

a processing unit disposed on said base below said transfer unit, said processing unit comprising a plurality of crushing wheel cutter sets and a power unit for driving the plurality of said crushing wheel cutter sets; and a recycling area located at a bottom of said base below said processing unit, said recycling area comprising a collection device located below the plurality of said crushing wheel cutter sets for collecting waste of the preset waste materials, and a conveyor belt located below said collection device for sending the waste to the outside.

2. The glass panel recycling mechanism as claimed in claim 1, wherein said base further comprises a feed area located on an outer side of said material inlet, said feed area comprising a feed conveyor belt positioned opposite to said material inlet, a driving unit for driving said feed conveyor belt to operate, and a plurality of abutting roller sets disposed on said feed conveyor belt.

3. The glass panel recycling mechanism as claimed in claim 1, wherein said base further comprises a working space therein for assembling said transfer unit and said processing unit, and a material inlet roller set driven by a power device and provided at said material inlet on one side of said working space, and said power device is a motor.

4. The glass panel recycling mechanism as claimed in claim 1, wherein said transfer unit further comprises a transmission device provided between said driving device and the plurality of said transfer wheel sets for transmitting power; said driving device of said transfer unit is a motor, and said transmission device being selectively a chain and sprocket set, a belt and belt pulley set, or a gear and rack set.

5. The glass panel recycling mechanism as claimed in claim 1, wherein said power unit of said processing unit is a motor; each of said crushing wheel cutter sets comprise a wheel axle and a wheel cutter assembled on said wheel axle in a sheet form or is integrally formed on said wheel axle, and said wheel cutters of the plurality of said crushing wheel cutter sets are of the same or different outer diameters.

6. The glass panel recycling mechanism as claimed in claim 5, wherein each said wheel cutter comprises a wheel portion and a plurality of cutting teeth formed on the periphery of said wheel portion, said cutting teeth being selected from the group of saw teeth, trapezoidal teeth, conical teeth and bevel teeth.

7. The glass panel recycling mechanism as claimed in claim 1, wherein said processing unit further comprises a transmission device provided between said power unit and the plurality of said crushing wheel cutter sets for transmitting power, said transmission device being selectively a chain and sprocket set, a belt and belt pulley set, or a gear and rack set.

* * * * *